(12) United States Patent
Stark et al.

(10) Patent No.: US 10,494,917 B2
(45) Date of Patent: Dec. 3, 2019

(54) DOWNHOLE TELEMETRY SYSTEM USING FREQUENCY COMBS

(71) Applicant: Halliburton Energy Services, Inc., Houston, TX (US)

(72) Inventors: Daniel Joshua Stark, Houston, TX (US); Satyan Gopal Bhongale, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/765,672

(22) PCT Filed: Nov. 13, 2015

(86) PCT No.: PCT/US2015/060660
§ 371 (c)(1),
(2) Date: Apr. 3, 2018

(87) PCT Pub. No.: WO2017/082928
PCT Pub. Date: May 18, 2017

(65) Prior Publication Data
US 2018/0291731 A1 Oct. 11, 2018

(51) Int. Cl.
*E21B 47/12* (2012.01)
*E21B 47/04* (2012.01)
(Continued)

(52) U.S. Cl.
CPC ........... *E21B 47/123* (2013.01); *E21B 47/04* (2013.01); *G02F 1/365* (2013.01); *H04B 10/503* (2013.01);
(Continued)

(58) Field of Classification Search
None
See application file for complete search history.

(56) References Cited

U.S. PATENT DOCUMENTS 725,605 A    7/1900  Tesla
3,626,315 A  12/1971 Stirling et al.
(Continued)

FOREIGN PATENT DOCUMENTS

EP  0589683    3/1994
EP  2343840    7/2011
(Continued)

OTHER PUBLICATIONS

"Coherent terabit communications with microresonator Kerr frequency combs" Pfeifle et al. Published Apr. 12, 2014.
(Continued)

*Primary Examiner* — Michael Stahl
(74) *Attorney, Agent, or Firm* — John Wustenberg; C. Tumey Law Group PLLC (57) ABSTRACT

A method and system for transmitting information in well operations. The method for transmitting information may comprise splitting a coherent light into a plurality of wavelengths with a demultiplexer within a fiber comb transmitter and encoding information onto at least one of the plurality of wavelengths within the fiber comb transmitted. The method may further comprise combining the plurality of wavelengths into a second coherent light with a wavelength division multiplexer within the fiber comb transmitter and broadcasting the second coherent light from the frequency comb transmitter. A downhole telemetry system may comprise a frequency comb transmitter, which may comprise a laser source and a modulator. The modulator may further comprise a demultiplexer, an encoder, and a wavelength division multiplexer. The frequency comb transmitter may also comprise a fiber optic cable and a frequency comb receiver.

20 Claims, 4 Drawing Sheets

(51) Int. Cl.

| | | |
|---|---|---|
| *G02F 1/365* | (2006.01) | |
| *H04B 10/50* | (2013.01) | |
| *H04B 10/532* | (2013.01) | |
| *H04B 10/572* | (2013.01) | |
| *H04J 14/02* | (2006.01) | |

(52) U.S. Cl.
CPC ......... *H04B 10/506* (2013.01); *H04B 10/532* (2013.01); *H04B 10/572* (2013.01); *H04J 14/026* (2013.01)

(56) References Cited

U.S. PATENT DOCUMENTS

| | | | |
|---|---|---|---|
| 6,631,019 | B1 | 10/2003 | Vujkovic-Cvijin et al. |
| 7,203,402 | B2 | 4/2007 | Haensch et al. |
| 7,248,178 | B2 | 7/2007 | Layton |
| 7,324,195 | B2 | 1/2008 | Packirisamy et al. |
| 7,696,901 | B2 | 4/2010 | Wilson et al. |
| 7,881,620 | B2 | 2/2011 | Nicholson et al. |
| 7,912,647 | B2 | 3/2011 | DiFoggio |
| 7,982,632 | B2 | 7/2011 | Miller |
| 8,818,207 | B2 | 8/2014 | Tanaka et al. |
| 9,088,371 | B2 | 7/2015 | Witzens |
| 2002/0186435 | A1 | 12/2002 | Shpantzer et al. |
| 2003/0193710 | A1* | 10/2003 | Chowdhury ............... G02F 2/02 359/326 |
| 2004/0093950 | A1* | 5/2004 | Bohnert ................ G01L 11/025 73/705 |
| 2005/0270172 | A1 | 12/2005 | Bailey et al. |
| 2006/0102347 | A1 | 5/2006 | Smith |
| 2006/0263096 | A1* | 11/2006 | Dinu .................... H04L 9/0858 398/187 |
| 2007/0166048 | A1 | 7/2007 | Doerr et al. |
| 2007/0258319 | A1* | 11/2007 | Ronnekleiv ........ G01D 5/35383 367/20 |
| 2011/0097083 | A1 | 4/2011 | Barrett |
| 2013/0089333 | A1* | 4/2013 | Shen ................... H04B 10/506 398/79 |
| 2013/0177316 | A1 | 7/2013 | Cardakli |
| 2013/0202303 | A1 | 8/2013 | Wilkinson et al. |
| 2014/0326860 | A1* | 11/2014 | Choi ...................... G01H 9/004 250/227.11 |
| 2015/0315905 | A1 | 11/2015 | Xu et al. |
| 2017/0111716 | A1* | 4/2017 | Wellbrock ......... H04Q 11/0005 |
| 2018/0313974 | A1* | 11/2018 | Barfoot ............. G01B 9/02027 |

FOREIGN PATENT DOCUMENTS

| | | |
|---|---|---|
| WO | 2008118931 | 10/2008 |
| WO | 2009048821 | 4/2009 |

OTHER PUBLICATIONS

"Optical frequency comb technology for ultra-broadband radio-frequency photonics" Victor Torres-Company published Dec. 18, 2013.

"Operating Principle of the WDM technology" Xens Dated 2014.

"Optical frequency comb generation from a monolithic microresonator" Del'Haye et al. Pubished Dec. 20, 2007.

"CMOS-compatible multiple-wavelength oscillator for on-chip optical interconnects" Levy et al. Published Dec. 20, 2009.

"Fully integrated, Multiport, Planar-waveguide, Spectral Comparators and Multiplexers based on Lithographic Holography" Mossberg et al. dated Aug. 31, 2005.

"Submicron planar waveguide diffractive photonics" Mossberg et al. dated 2005.

"Non-reciprocal Brillouin scattering induced transparency" Kim et al. Published Jan. 26, 2015.

"26 Tbit s-1 line-rate super-channel transmission utilizing all-optical fast Fourier transform processing" Killerkuss et al. Published May 22, 2011.

"A New Class of Spreading Waveforms for Cdma" White et al. published Nov. 29, 1992.

International Search Report and Written Opinion for PCT/US2015/060660 dated Aug. 12, 2016.

\* cited by examiner

DOWNHOLE TELEMETRY SYSTEM USING FREQUENCY COMBS

BACKGROUND

The present disclosure relates to a system and method for increasing the reliability and transmission data-rate of downhole optical fiber telemetry to the surface. More particularly, the present disclosure relates generally to transmitting large amounts of data using frequency combs.

As downhole operations obtain ever greater amounts of data for efficient and thorough job completion, optical fiber telemetry is being implemented in an ever-increasing number of products to provide higher data rate transmission of information and data. Currently, the use of optical fiber telemetry may encounter interference and fading effects as data is transmitted over long distances. Fiber optic communication in downhole applications have also traditionally been limited to single wavelengths. This may make optical fiber telemetry in a wellbore difficult and expensive to perform. Furthermore, interference and fading effects may corrupt and/or lose data, which may prevent operators from recording and identifying all downhole conditions.

BRIEF DESCRIPTION OF THE DRAWINGS

These drawings illustrate certain aspects of some of the examples of the present invention, and should not be used to limit or define the invention.

DETAILED DESCRIPTION

The present disclosure relates generally to a system and method for increasing the reliability and data-rate transmission of information from a downhole device to the surface and from the surface to the downhole device. More particularly, a system and method using frequency combs may be provided. The disclosure describes a system and method for increasing data rates, for reducing interference, and for reducing transmission fading effects by providing a coherent light source with narrow and well-defined spectral lines that span a broad spectral range, and a mechanism to modulate the individual spectral lines using a frequency comb. In an optical fiber telemetry system, light propagating in optical fibers may be used for carrying information from a transmitter to a receiver. Traditionally, the optical linewidth of light in fiber optic communication is broad, which may limit data transmission to fewer than one hundred and sixty channels. For example, ultra-dense wavelength division multiplexing may only allow eight channels. By increasing the number of channels, transmission of data up to one terabit per second may be possible. Without limitation, this may be accomplished using a frequency comb transmitter integrated with a wavelength division multiplexing modulation system.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In certain examples, the present disclosure may use fiber optics. Fiber optic cables may be used to transmit light for communications and optical sensing. For example, in optical sensing, light may be used to acquire various signal types, such as temperature, pressure, strain, acceleration, chemical spectral signatures and the like. Optical sensing may be used in a wellbore by communicating light between a source and downhole sensors or actuators (or both). The fiber optic cables may be embedded in the wellbores casing and/or run down into the wellbore with a well tool (e.g., a logging tool string in a drill pipe string). Fiber optics may allow for a large amount of data to be transmitted over distance quickly and completely.

A downhole telemetry system may comprise an information handling system, a frequency comb transmitter, a frequency comb receiver, fiber optic cables, and any other optics necessary to filter, amplify, attenuate, split, combine, frequency shift, rotate polarization of, adjust phase of, or in any other way condition light. The frequency comb transmitter may further comprise a laser source, a frequency comb, a wavelength division multiplexer, modulator, and encoding schemes. The frequency comb receiver may comprise an optical modulation analyzer and a wavelength division demultiplexer. The information handling system may be connected to the frequency comb transmitter and/or the frequency comb receiver for sending and analyzing information and data. The downhole telemetry system may allow for large amounts of information to be transmitted across large distances and at a high rate of speed.

Accordingly, this disclosure describes methods and systems which may be used for transmitting information in well operations. A method for transmitting information in well operations may comprise splitting a coherent light into a plurality of wavelengths with a demultiplexer within a fiber comb transmitter and encoding information onto at least one of the plurality of wavelengths within the fiber comb transmitter. The method may also comprise combining the plurality of wavelengths into a second coherent light with a wavelength division multiplexer within the fiber comb transmitter and broadcasting the second coherent light from the frequency comb transmitter. In examples, the frequency comb transmitter may comprise a modulator. The modulator may comprise the wavelength division multiplexer, an encoder, and the demultiplexer. Additionally, the frequency comb transmitter may be disposed on a surface of a wellbore and the frequency comb receiver may be disposed within the wellbore. The frequency comb transmitter and the frequency comb receiver may be connected by at least one fiber optic cable.

In examples, the frequency comb receiver may be disposed on a surface of a wellbore and the frequency comb transmitter may be disposed within the wellbore. The frequency comb receiver and the frequency comb transmitter may be connected by at least one fiber optic cable. Additionally, components of the frequency comb transmitter may be disposed in different locations. For example, the laser source and frequency comb may be disposed on a surface of a wellbore, a modulator may be disposed in the wellbore, and the frequency comb receiver may be disposed on the surface. Further, the frequency comb transmitter may be attached to a device that detects energy waves, properties of the wellbore, and properties of the surrounding environment. The device may processes information sent by energy waves and may also direct the information to the frequency comb transmitter. The frequency comb transmitter may broadcast the information on the coherent light through the fiber optic cable, which may be received by the frequency comb receiver in the wellbore. The modulator may further comprise the demultiplexer, an encoder, and the wavelength division multiplexer.

In additional examples, the frequency comb transmitter and the frequency comb receiver may be disposed in a wellbore. The frequency comb transmitter may be attached to a device that detects energy waves, properties of the wellbore, and properties of the surrounding environment. The device may process information sent by energy waves and may further direct the information to the frequency comb transmitter. The frequency comb transmitter may broadcast the information on the coherent light through the fiber optic cable, where it may be received by the frequency comb receiver in the wellbore.

The method for transmitting information in well operations, in additional examples, may further comprise broadcasting the coherent light from the frequency comb transmitter on the surface to a downhole device and broadcasting the coherent light from the frequency comb transmitter on the downhole device to the surface of a wellbore.

A downhole telemetry system may comprise a frequency comb transmitter, a fiber optic cable, and a frequency comb receiver. The frequency comb transmitter may further comprise a laser source and a modulator. The modulator may also comprise a demultiplexer, an encoder, and a wavelength division multiplexer. In examples, the frequency comb transmitter may be disposed on a surface of the wellbore and the frequency comb receiver may be disposed in the wellbore. The frequency comb transmitter and frequency comb receiver may also be connected by the fiber optic cable. The frequency comb transmitter may be attached to a device that may be sensitive to energy waves, properties of the wellbore, and properties of the surrounding environment. The device may be configured to process information sent by energy waves and direct the information to the frequency comb transmitter. The frequency comb transmitter may be configured to broadcast the information on coherent light through the fiber optic cable and the information may be received by the frequency comb receiver in the wellbore.

In examples, components of the frequency comb transmitter may be disposed at different locations. The laser source may be disposed on a surface of the wellbore and the modulator may be disposed in the wellbore. The fiber optic cable may connect the laser source and the modulator. The frequency comb receiver may also be disposed on the surface and may be connected to the modulator by a second fiber optic cable. The frequency comb transmitter may be attached to a device that may be sensitive to energy waves, properties of the wellbore, and properties of the surrounding environment. The device may be configured to process information sent by energy waves and direct the information to the frequency comb transmitter. The frequency comb transmitter may be configured to broadcast the information on coherent light through the fiber optic cable and the information may be received by the frequency comb receiver in the wellbore. Additionally, the modulator may be attached to a downhole device.

In additional examples, the frequency comb transmitter may be disposed in a wellbore and the fiber comb receiver may be disposed on the surface of the wellbore. The frequency comb transmitter and the frequency comb receiver may be connected to the fiber optic cable. Additionally, the frequency comb transmitter may be disposed on a downhole device and the downhole device may provide information for transmission to the frequency comb transmitter and to the frequency comb receiver on the surface for analyses.

In further examples, the frequency comb transmitter and the frequency comb receiver may be disposed within a wellbore. The frequency comb transmitter may be attached to a device that may be sensitive to energy waves, properties of the wellbore, and properties of the surrounding environment. The device may be configured to process information sent by energy waves and direct the information to the frequency comb transmitter. The frequency comb transmitter may be configured to broadcast the information on coherent light through the fiber optic cable and the information may be received by the frequency comb receiver in the wellbore. The frequency comb transmitter and the frequency comb receiver may be attached by at least two fiber optic cables. Additionally, the frequency comb transmitter may be attached to a downhole device.

Figure 1:
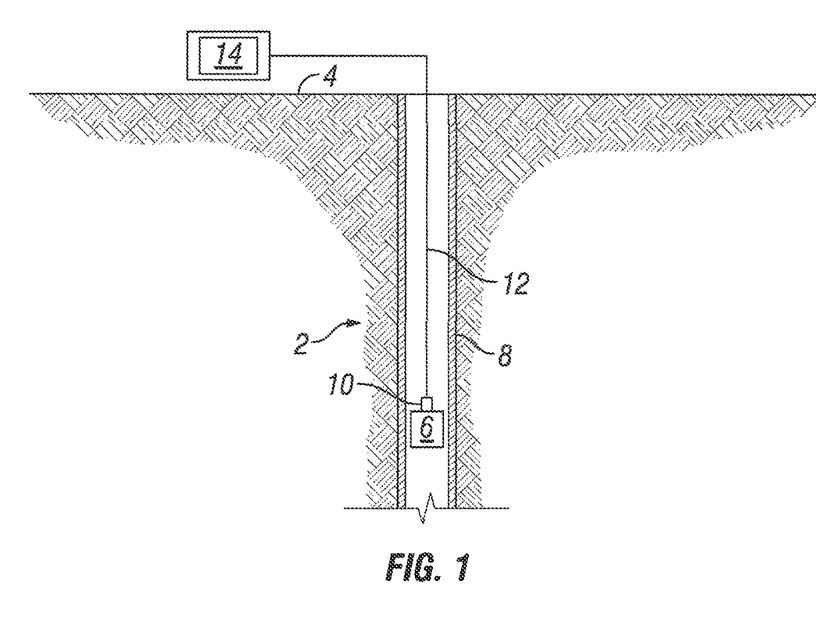
FIG. 1 is an example of a downhole telemetry system.

FIG. 1 illustrates an example of a downhole telemetry system 2 for transmitting data to a surface 4 from a downhole device 6. In examples, downhole device 6 may be disposed at any depth within wellbore 8. While not illustrated, wellbore 8 may be cased or uncased. As illustrated, a frequency comb transmitter 10 may be disposed on downhole device 6. Frequency comb transmitter 10 may be disposed at any suitable location on and/or within downhole device 6. For example, frequency comb transmitter 10 may be disposed on the outside surface of downhole device 6. More specifically, on a top surface, a bottom surface, and/or a side surface of downhole device 6. Still further, frequency comb transmitter 10 may be disposed within downhole device 6. In examples, frequency comb transmitter 10 may be disposed within downhole device 6 at a top, at a bottom, and/or between the top and bottom within downhole device 6. Frequency comb transmitter 10 may take data and information recorded and/or received by downhole device 6 and transmit it through fiber optic cable 12 to frequency comb receiver 14.

Downhole device 6 may include any of a variety of devices that may be disposed in wellbore 8 for well operations. By way of example, downhole device 6 may be logging tool, which may include a casing collar locator, a gamma ray tool, and/or sensors (e.g., a pressure sensor, temperature sensor, etc.). Other types of devices may include bottomhole assemblies, permanent sensor box installations, artificial list systems, subsea installations, or sensor systems on pigs, darts, and/or plugs.

While not illustrated, any of a variety of suitable means may be used for conveyance of downhole device 6 into wellbore 8. In some examples, the downhole device 6 may be conveyed into wellbore 8 using coiled tubing (e.g., a substantially continuous tubular string, typically stored on a reel) and/or a wireline. However, the scope of this disclosure is not limited to any particular form of the conveyance of downhole device 6 into wellbore 8. Furthermore, it may be installed permanently in the wellbore, such as behind casing.

Figure 2:
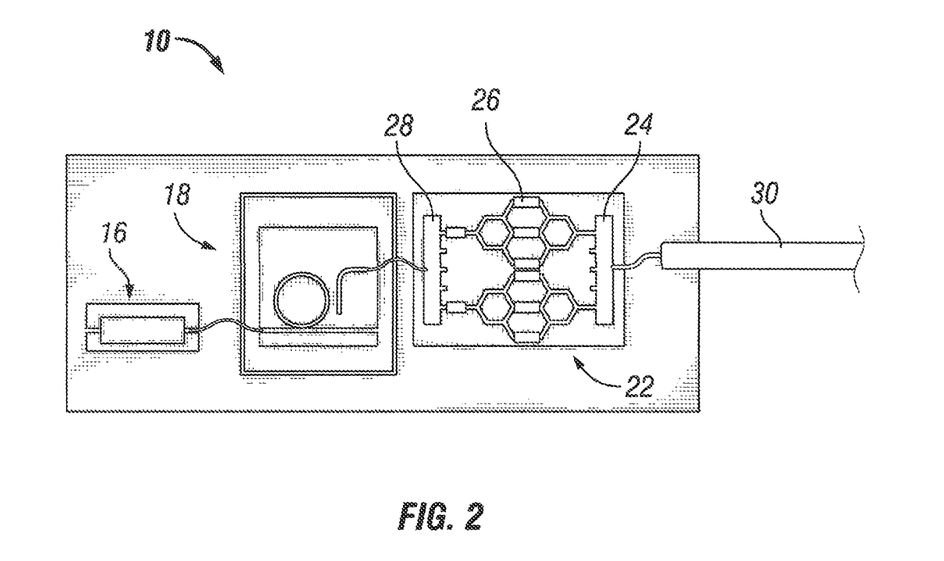
FIG. 2 is an example of a frequency comb transmitter.

FIG. 2 illustrates an example of a frequency comb transmitter 10. Without limitation, frequency comb transmitter 10 may be a field-able monolithographically integrated frequency comb transmitter. However, while FIG. 2 may illustrate frequency comb transmitter 10 in the form of a field-able monolithographically integrated frequency comb transmitter, the scope of the disclosure is not limited to any particular form of frequency comb transmitter 10. Frequency comb transmitter 10 may comprise a laser source 16, a frequency comb 18, and at least one optical modulator 22. Laser source 16 may be disposed within frequency comb transmitter 10 at any suitable location. A suitable location may be, but is not limited to, within a top, a bottom, and/or between the top and bottom of frequency comb transmitter 10. In examples, laser source 16 may provide a carrier offset frequency from which all wavelengths, which may carry data during transmission, may be generated. Laser source 16 may comprise any of a variety of suitable laser sources, including, but not limited to, a pump laser, titanium-sapphire laser, fiber laser, narrow-band vertical cavity surface emitting laser, narrow-band quantum dot laser, a cavity laser, and/or the like. Additionally, the carrier offset frequency, $f_0$, may correspond to a frequency less than the comb teeth spacing, ranging from 0 Hz to 800 THz. Specifically, frequencies of 193.4 THz (wavelength of 1550 nanometers) and/or 228.8 THz (wavelength of 1310 nanometers) may be selected for their low-absorption characteristics in fiber. The carrier offset frequency generated by laser source 16 may be transferred to frequency comb 18.

Figure 3:
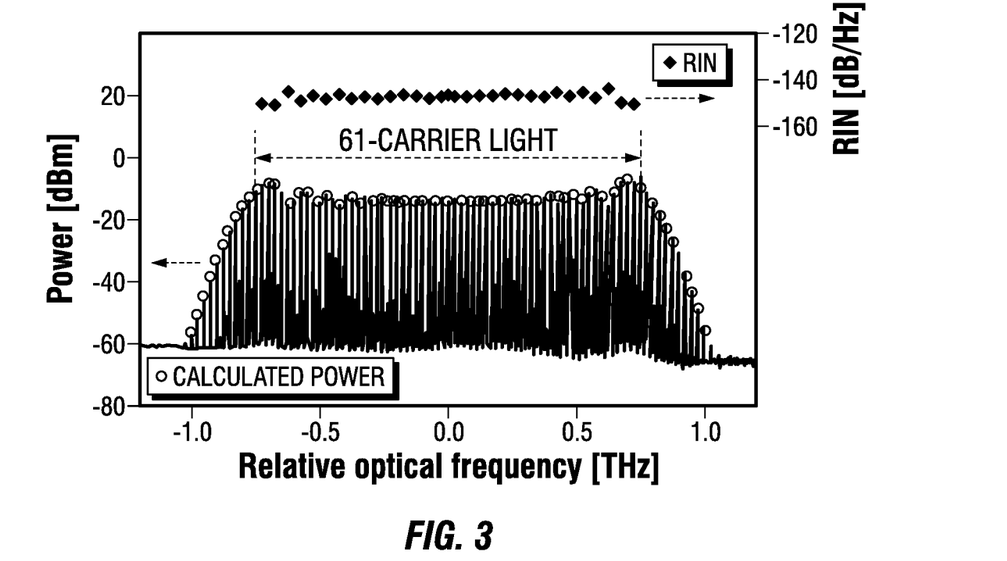
FIG. 3 is a graph illustrating a possible number of accessible carrier lights.

Frequency comb 18 may take the carrier offset frequency from laser source 16 and generate mode locked light pulses at precise time intervals providing well defined frequency separations from the carrier offset frequencies. Frequency separations may be described as $f(n)=f_0+n\,f_r$, where n may be the mode and $f_r$ may be the mode separation, otherwise known as the comb tooth spacing, the repetition rate (for mode locked lasers), or the AM frequency. Mode separations may range from the order of 10 s MHz to 100 THz, which may lead up to approximately fifteen hundred "teeth" in a single typical frequency comb 18. Referring to FIG. 3, each tooth may be made available to carry information and/or data. FIG. 3 illustrates the number of teeth that may be created and used by an exemplary frequency comb 18. The graph in FIG. 3 illustrates sixty one different frequencies, "teeth" or carrier lights, which may be used to carry information and/or data. Teeth, in FIG. 3, that may be used to carry information and/or data may all comprise about the same amount of power and range across a relative optical frequency. The range of the frequency may allow frequency comb 18 to incorporate as many teeth as possible, but typically spans at least one octave. A single frequency comb 18 may be generated using, without limitation, micro resonators, electro-optic generators, flat-top frequency generators, parametric generators, CW laser injection locking, mode-locked lasers in a cavity, four-wave mixing, electronics generate a pulse sequence, and the like. In examples, micro resonators and electro-optic generators may be the most robust option for frequency comb 18 generation, as they may be monolighographically integrated with other optical components, minimizing size and mitigating material failure of interconnects in harsh environments. Each individually separated frequency from a wavelength may have information and data encoded to individual frequency through modulators 22.

Modulator 22 may be disposed within frequency comb transmitter 10 at any suitable location. A suitable location may be, but is not limited to, within a top, a bottom, and/or between the top and bottom of frequency comb transmitter 10. Modulator 22 may attach to frequency comb 18 and encode information onto wavelengths transmitted from frequency comb 18 to modulator 22. Without limitation, modulator 22 may comprise a wavelength division multiplexer 24, encoders 26, and a demultiplexer 28. Other optical components that modify the amplitude, phase, frequency, polarization, or wavenumber of one or more "teeth" may also be utilized in modulator 22. Modulator 22 may encode data onto individual frequencies of a wavelength, which may also be referred to as "channels." The frequencies may be encoded with phase information using electro-optic based phase modulators and/or fiber stretches. Alternatively, the channel may be encoded with amplitude modulation using electro-optic based amplitude modulators, semiconductor optical amplifiers, electroabsorption modulators, and/or fiber attenuators. The channel may also be encoded with information by modifying the polarization state through modification of the strain state of the light waveguide or through use of the Faraday Effect, the magneto-optic Kerr effect, or some other magneto-optic effect. Additionally, lithographically patterned devices may be used as a modulator and/or may be used in series within modulator 22. Modulator 22 may take coherent light from frequency comb 18 and split the coherent light into different wavelengths using demultiplexer 28. Without limitation, demultiplexer 28 may be the first component in which the coherent light may be manipulated within modulator 22. Demultiplexer 28 may be comprised of a single mode fused taper coupler, grating demultiplexers, interferometers, micro-optic based filter, metamaterial-based filter, and/or tunable filters. Specifically, demultiplexer 28 may comprise Tunable Optical Filters such as Fabry-Perot Filters, Mach-Zehnder Filters, Grating-Based Filters, Acousto-Optic Filters, and Amplifier-Based Filters. Additionally, demultiplexers 28 may be specifically grating-based demultiplexers, arrayed-waveguide gratings and/or phased-array demultiplexers, and/or planar waveguides. Demultiplexer 28 may be composed of a free-standing, but supported, component or be integrated into a larger photonic-integrated-circuit or monolithographic system. Demultiplexer 28 may separate the light into different wavelengths, preparing the wavelengths for encoding within modulator 22 using encoder 26.

Encoders 26 may allow for a variety of different encoding schemes. Encodings schemes may encode information and data on individual wavelengths, which may be transmitted to a receiver. Encoding schemes may comprise amplitude-shift keying, phase-shift keying, frequency shift keying, orthogonal frequency-division multiplexing, pulse-amplitude modulation, quadrature amplitude modulation, and/or the like. Encoding schemes chosen may lead to a different number of bits that may be encoded into the data stream, which may be chosen to mitigate an optical limitations; for example, using phase-shift keying for systems with uncontrollable amplitude modulations. Additionally, each frequency may be encoded separately. By taking advantage of repetition rates that may reach greater than 10 s GHz, distinct frequencies may be utilized to transmit data, which may be useful for optical wave form syntheses and/or choosing a frequency with the highest stability and/or signal-to-nose ratios to send data. High repetition rates may allow for data to be spread across multiple frequencies, using a variation of spread-spectrum communication similar to a code-division multiple access. The data may be encoded on different frequencies randomly and/or pseudo-randomly, but the encoded will be on known and distinct frequencies. An equivalent sequence of frequencies may then be sampled and the data stream reconstructed from individual pieces of data. However, data may become corrupted and/or lost as the coherent light traverses fiber optic cable 12. Outside stimulus, movement of fiber optic cable 12, reflections, and manufacturing deficiencies within fiber optic cable 12 may lead to interference and channel fading. Without limitation, wavelength hoping may be useful for mitigating interferences and/or greater attenuation, due to channel fading, which may occur in long stretches of optical fiber. Additionally, by spreading out the data signal among many frequencies, only a few bits of data for any byte may be corrupted due to transmission on a bad channel. The data may then be corrected using techniques such as forward error correction or any other error correction technique. A spread-spectrum technique may be expanded through optically, which may allow frequencies to transmit sets of data that overlap but may be orthogonal to each other and at a different phase. These techniques of encoding data may help in preventing the loss and/or corruption of encoded data. They may also allow more bits per symbol of data to be transmitted. After encoding frequencies with data and information, modulator 22 may combine the frequencies into a single beam of coherent light through wavelength division multiplexer 24

Wavelength division multiplexer 24 may combine wavelengths encoded with data into a single source of coherent light. Located within modulator 22, wavelength division multiplexer 24 may comprise, without limitation, grating mutliplexers, fiber couplers, star couplers, directional couplers, couplers with Mach-Zehnder interferometers, fused biconical tapers, add-drop multiplexers, planar wave guides, monolithographic multiplexers, and/or combinations thereof. Once combined, the single source of coherent light may be transmitted out transmitter 30 and into fiber optic cable 12. The coherent light, with encoded data may traverse a single fiber optic cable 12 to frequency comb receiver 14. In other examples, coherent light may be transmitted from transmitter 30 into two and/or more fiber optic cables 12. Information and data transmitted through two or more fiber optic cables 12 may be verified, removing duplications, before analyses within an information handling system. In examples, fiber optic cable 12 may run for feet and/or miles before attaching to frequency comb receiver 14.

Frequency comb receiver 14, as illustrated in FIG. 1, may be dispose on the surface, above wellbore 8. Without limitation, frequency comb receiver 14 may comprise an optical modulation analyzer. An optical modulation analyzer may use an optical bandpass filter and a local oscillator to select wavelengths to be demodulated. Optical modulation analyzer may also employ fast Fourier and inverse fast Fourier transforms to decode data encoded in a frequency domain. Additionally, grating with photodetectors may be used to help speed decoding as well as inline broadband fiber amplifiers, lithographic-based wavelength division multiplexers, optical transmission encoding schemes, narrowband filters, secondary frequency combs, and/or the like. Frequency comb transmitter 10 may transmit data and information, within light, from wellbore 8 through fiber optic cable 12 to frequency comb receiver 14 on surface 4. However, the components of frequency comb transmitter 10 may be separated into different modules and disposed in different locations.

FIG. 1 illustrates an example of downhole telemetry system 2 in which information and data may be transmitted from a downhole device 6 to the surface 4. Frequency comb transmitter 10 may encode and send data using light, which may traverse frequency optic cable 12 to frequency comb receiver 14. It should be understood that the present invention should be not limited to the particular configuration of FIG. 1. For example, frequency comb transmitter 10 and frequency comb receiver 14 may be disposed at different locations.

Figure 4:
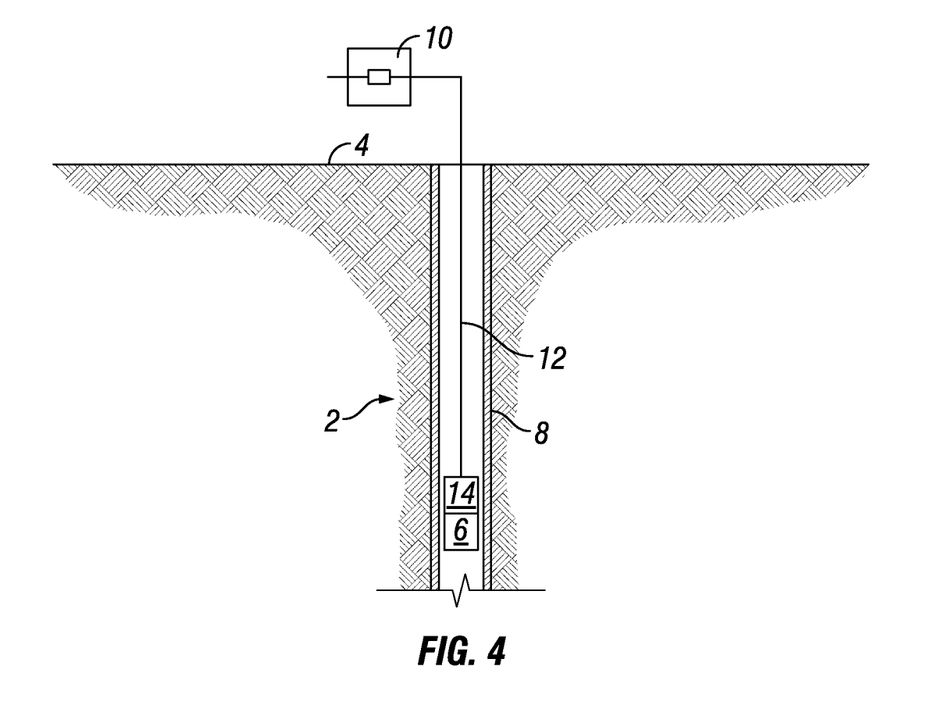
FIG. 4 is another example of a downhole telemetry system.

Referring now to FIG. 4, an example of downhole telemetry system 2 that include frequency comb transmitter 10 located at the surface 4 while frequency comb receiver 14 may be located in the wellbore 8. In these examples, information and data, such as command and directional information, may be encoded by frequency comb transmitter 10 on surface 4. The information may be transmitted by frequency comb transmitter 10 by light, which may traverse frequency optic cable 12 and be received by frequency comb receiver 14. Frequency comb receiver 14 may then read the data encoded on the light. The information and data may then be distributed to downhole device 6, which may perform the desired function transmitted from operators on surface 4.

Figures 5, 6:
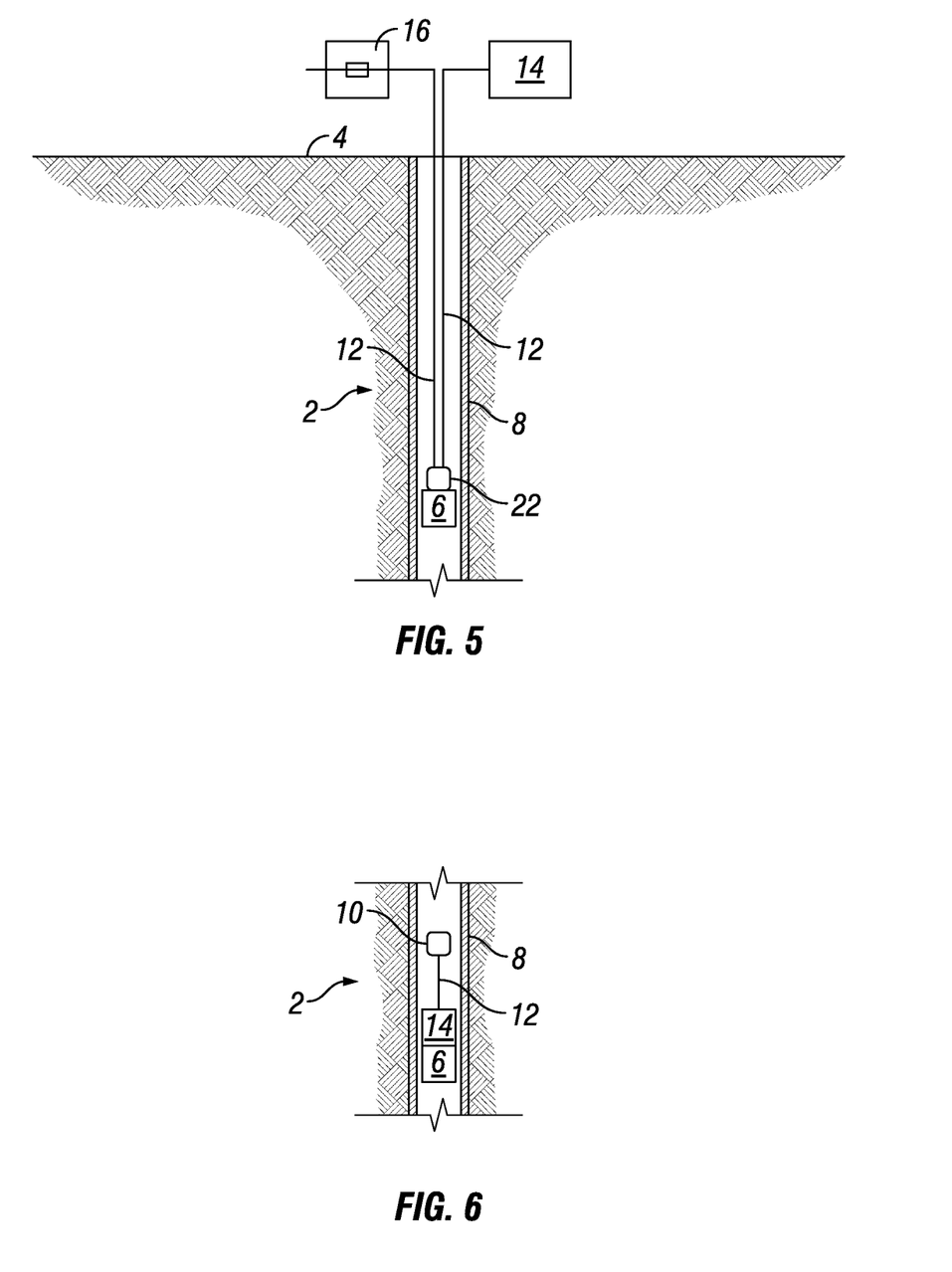
FIG. 5 is another example of a downhole telemetry system.
FIG. 6 is another example of a downhole telemetry system.

FIG. 5 illustrates another example of downhole telemetry system 2 in which components of frequency comb transmitter 10 may be disposed in separate locations. As illustrated, modulator 22 may be disposed in the wellbore 8 while laser source 16 may be disposed at surface 4. Specifically, modulator 22 may be disposed on downhole device 6. Modulator 22 may be disposed at any suitable location on and/or within downhole device 6. For example, modulator 22 may be disposed on the outside surface of downhole device 6. More specifically, on a top surface, a bottom surface, and/or a side surface of downhole device 6. Still further, modulator 22 may be disposed within downhole device 6. In examples, modulator 22 may be disposed within downhole device 6 at a top, at a bottom, and/or between the top and bottom within downhole device 6. Coherent light may be emitted from laser source 16, which may be disposed on surface 4. Additionally, coherent light may traverse fiber optic cable 12 and be received by modulator 22, which may be disposed on downhole device 6. Modulator 22 may encode information and data from downhole device 6, as described above, on to the coherent light. Coherent light, with encoded information and data, may traverse a second, or the same, fiber optic cable 12 and may be received by frequency comb receiver 14, which may be located at surface 4. Frequency comb receiver 14 may decode the information and data encoded on the light for analysis by operators on surface 4.

Additionally, FIG. 6 illustrates another example of downhole telemetry system 2 in which frequency comb transmitter 10 and frequency comb receiver 14 may be disposed within wellbore 8. As illustrated, frequency comb transmitter 10 may be disposed and/or suspended within wellbore 8. Without limitation, frequency comb transmitter 10 may attach to a device that receivers and deciphers pressure waves, optical waves, sound waves, temperatures, strains, chemical compositions, and/or the like. Information and data transmitted may then be transferred to frequency comb transmitter 10. Frequency comb transmitter 10 may then encode the information and/or data, as described above, and transmit the data by light through fiber optic cable 12. The light may be received by frequency comb receiver 14, which may decode the information and/or data stored on the light, as described above. Frequency comb receiver 14 may then decode the data and information encoded on the light. The information and data may then be distributed to downhole device 6, which may perform the desired function transmitted from operators on surface 4.

Figure 7:
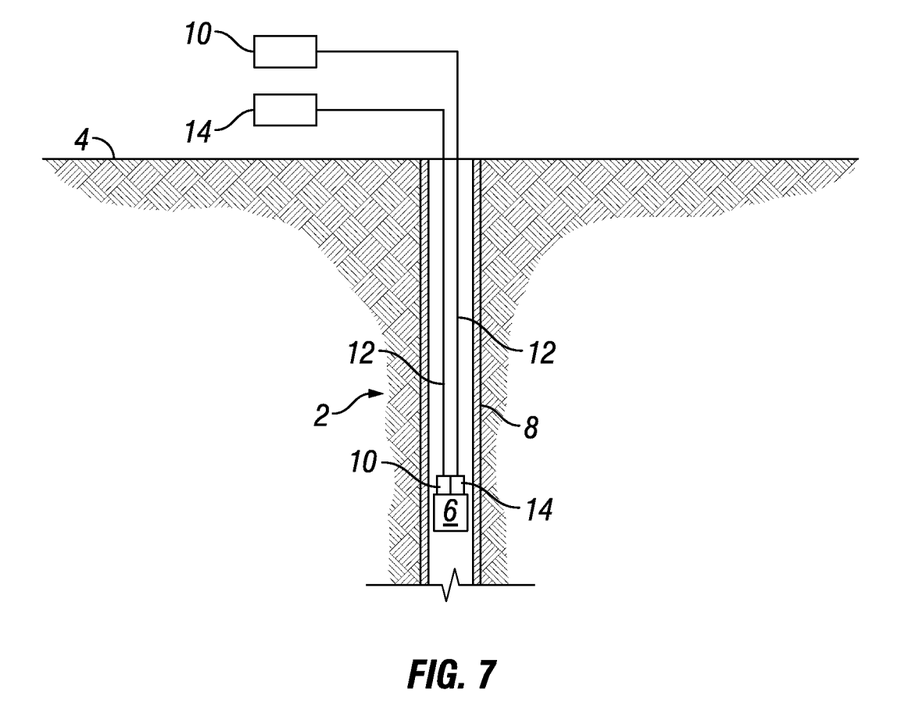
FIG. 7 is another example of a downhole telemetry system.

FIG. 7 illustrates an example of a downhole telemetry system 2 in which may comprise at least two frequency comb transmitters 10 and at least two frequency comb receivers 14. In examples, frequency comb transmitter 10 may be located at the surface 4 while frequency comb receiver 14 may be located in the wellbore 8. Information and data, such as command and directional information, may be encoded by frequency comb transmitter 10 on surface 4. The information may be transmitted by frequency comb transmitter 10 by light, which may traverse frequency optic cable 12 and be received by frequency comb receiver 14. Frequency comb receiver 14 may then read the data encoded on the light. The information and data may then be distributed to downhole device 6, which may perform the desired function transmitted from operators on surface 4. Additionally, information and data from downhole device 6 may be transmitted from downhole device 6 to the surface 4. Frequency comb transmitter 10 may encode and send data using light, which may traverse frequency optic cable 12 to frequency comb receiver 14 on surface 4. The information and data may be decoded and analyzed by operators on surface 4.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for transmitting information in well operations comprising:
    splitting a coherent light into a plurality of wavelengths with a demultiplexer within a frequency comb transmitter disposed in a wellbore;
    encoding information onto at least one of the plurality of wavelengths within the frequency comb transmitter;
    combining the plurality of wavelengths into a second coherent light with a wavelength division multiplexer within the frequency comb transmitter; and
    broadcasting the second coherent light from the frequency comb transmitter.

2. The method of claim 1, wherein the frequency comb transmitter comprises a modulator, and optionally, wherein the modulator comprises the wavelength division multiplexer, an encoder, and the demultiplexer.

3. The method of claim 1, wherein the frequency comb transmitter is disposed on a surface of a wellbore and a frequency comb receiver is disposed within the wellbore, wherein the frequency comb transmitter and the frequency comb receiver are connected by at least one fiber optic cable.

4. The method of claim 1, wherein a frequency comb receiver is disposed on a surface of a wellbore and the frequency comb transmitter is disposed within the wellbore, wherein the frequency comb receiver and the frequency comb transmitter are connected by at least one fiber optic cable.

5. The method of claim 1, wherein components of the frequency comb transmitter are disposed in different locations, wherein a laser source is disposed on a surface of a wellbore, wherein a modulator is disposed in the wellbore, and wherein a frequency comb receiver is disposed on the surface.

6. The method of claim 5, wherein the frequency comb transmitter is attached to a device that detects energy waves, properties of the wellbore, and properties of the surrounding environment, wherein the device processes information sent by energy waves and directs the information to the frequency comb transmitter, wherein the frequency comb transmitter broadcasts the information on the coherent light through the fiber optic cable and the information is received by the frequency comb receiver in the wellbore.

7. The method of claim 5, wherein the modulator comprises the demultiplexer, an encoder, and the wavelength division multiplexer.

8. The method of claim 1, wherein the frequency comb transmitter and a frequency comb receiver are disposed in a wellbore.

9. The method of claim 8, wherein the frequency comb transmitter is attached to a device that detects energy waves, properties of the wellbore, and properties of the surrounding environment, wherein the device processes information sent by energy waves and directs the information to the frequency comb transmitter, wherein the frequency comb transmitter broadcasts the information on the coherent light through the fiber optic cable and is received by the frequency comb receiver in the wellbore.

10. The method of claim 1, further comprising:
broadcasting the coherent light from the frequency comb transmitter to a downhole device, wherein the frequency comb transmitter is disposed on surface; or
broadcasting the coherent light from the frequency comb transmitter to the surface of a wellbore, wherein the frequency comb transmitter is disposed on the downhole device.

11. A downhole telemetry system comprising:
a frequency comb transmitter comprising:
  a laser source; and
  a modulator disposed in a wellbore and further comprising:
    a demultiplexer;
    an encoder; and
    a wavelength division multiplexer;
a fiber optic cable; and
a frequency comb receiver.

12. The downhole telemetry system of claim 11, wherein the frequency comb receiver is disposed in the wellbore, wherein the frequency comb transmitter and frequency comb receiver are connected by the fiber optic cable.

13. The downhole telemetry system of claim 12, wherein the frequency comb transmitter is attached to a device that is sensitive to energy waves, properties of the wellbore, and properties of the surrounding environment, wherein the device is configured to process information sent by energy waves and direct the information to the frequency comb transmitter, wherein the frequency comb transmitter is configured to broadcast the information on coherent light through the fiber optic cable and the information is received by the frequency comb receiver in the wellbore.

14. The downhole telemetry system of claim 11, wherein components of the frequency comb transmitter are disposed at different locations, wherein the laser source is disposed on a surface of a wellbore, wherein the fiber optic cable connects the laser source and the modulator, and wherein the frequency comb receiver is disposed on the surface and is connected to the modulator by a second fiber optic cable.

15. The downhole telemetry system of claim 14, wherein the frequency comb transmitter is attached to a device that is sensitive to energy waves, properties of the wellbore, and properties of the surrounding environment, wherein the device is configured to process information sent by energy waves and direct the information to the frequency comb transmitter, wherein the frequency comb transmitter is configured to broadcast the information on coherent light through the fiber optic cable and the information is received by the frequency comb receiver in the wellbore.

16. The downhole telemetry system of claim 14, wherein the modulator is attached to a downhole device.

17. The downhole telemetry system of claim 11, wherein the frequency comb transmitter is disposed in a wellbore and the frequency comb receiver is disposed at surface, and wherein the frequency comb transmitter and the frequency comb receiver are connected to the fiber optic cable, wherein the frequency comb transmitter is disposed on a downhole device, and optionally, wherein the downhole device provides information for transmission to the frequency comb transmitter to the frequency comb receiver on the surface for analyses.

18. The downhole telemetry system of claim 11, wherein the frequency comb transmitter and the frequency comb receiver are disposed within a wellbore.

19. The downhole telemetry system of claim 18, wherein the frequency comb transmitter is attached to a device that is sensitive to energy waves, properties of the wellbore, and properties of the surrounding environment, wherein the device is configured to process information sent by energy waves and direct the information to the frequency comb transmitter, wherein the frequency comb transmitter is configured to broadcast the information on coherent light through the fiber optic cable and the information is received by the frequency comb receiver in the wellbore.

20. The downhole telemetry system of claim 11, wherein the frequency comb transmitter and the frequency comb receiver are attached by at least two fiber optic cables, and/or wherein the frequency comb transmitter is attached to a downhole device.

* * * * *